United States Patent [19]

Schmidt et al.

[11] 4,208,489
[45] Jun. 17, 1980

[54] POLYCARBONATE MOLDING COMPOSITIONS WITH IMPROVED FLAME-REPELLENCY

[75] Inventors: Manfred Schmidt, Krefeld; Wolfgang Cohnen, Leverkusen; Frank Kleiner, Cologne; Dieter Freitag; Karsten Idel, both of Krefeld, all of Fed. Rep. of Germany

[73] Assignee: Bayer Aktiengesellschaft, Leverkusen, Fed. Rep. of Germany

[21] Appl. No.: 868,145

[22] Filed: Jan. 9, 1978

[30] Foreign Application Priority Data

Jan. 29, 1977 [DE] Fed. Rep. of Germany ....... 2703710
Feb. 24, 1977 [DE] Fed. Rep. of Germany ....... 2707928
Sep. 10, 1977 [DE] Fed. Rep. of Germany ....... 2740850

[51] Int. Cl.² .......................... C08K 5/34; C08K 5/42; C08K 5/53
[52] U.S. Cl. .............................. 525/146; 260/45.7 P; 260/45.7 R; 260/45.7 S; 260/45.75 F; 260/45.8 N
[58] Field of Search ................ 260/45.8 NB, 45.7 SF, 260/45.75 F, 37 PC; 525/146

[56] References Cited

U.S. PATENT DOCUMENTS

| | | | |
|---|---|---|---|
| 2,795,589 | 6/1957 | Bluestone | 260/326 C |
| 3,005,795 | 10/1961 | Busse et al. | 260/873 |
| 3,103,501 | 9/1963 | Shearer, Jr. et al. | 260/45.95 B |
| 3,243,408 | 3/1966 | Donoian et al. | 260/45.95 B |
| 3,294,871 | 12/1966 | Schmitt et al. | 260/900 |
| 3,398,212 | 8/1968 | Jackson, Jr. et al. | 260/860 |
| 3,455,950 | 7/1969 | Cyba et al. | 260/45.8 NB |
| 3,475,372 | 10/1969 | Gable | 260/45.75 R |
| 3,624,024 | 11/1971 | Caldwell et al. | 260/45.8 NB |
| 3,634,311 | 1/1972 | Peterson et al. | 260/45.75 F |
| 3,651,174 | 3/1972 | Bialous | 260/873 |
| 3,663,495 | 5/1972 | Michael et al. | 260/45.8 NB |
| 3,671,487 | 6/1972 | Abolins | 260/873 |
| 3,775,367 | 11/1973 | Nouvertne | 260/45.7 SF |
| 3,784,595 | 1/1974 | Schirmer et al. | 260/37 PC |
| 3,873,567 | 3/1975 | Cyba | 260/45.8 NB |
| 3,940,366 | 2/1976 | Mark | 260/45.7 SF |
| 3,950,307 | 4/1976 | Richter et al. | 260/45.8 NB |
| 4,065,436 | 12/1977 | Adelmann et al. | 260/37 PC |
| 4,110,299 | 8/1978 | Mark | 260/37 PC |
| 4,113,695 | 9/1978 | Mark | 260/45.8 N |

FOREIGN PATENT DOCUMENTS

| | | |
|---|---|---|
| 2013496 | 9/1971 | Fed. Rep. of Germany . |
| 2057274 | 5/1972 | Fed. Rep. of Germany . |
| 2631756 | 2/1977 | Fed. Rep. of Germany . |
| 2744016 | 4/1978 | Fed. Rep. of Germany . |
| 2744018 | 4/1978 | Fed. Rep. of Germany . |
| 50-64337 | 5/1975 | Japan . |
| 50-119041 | 9/1975 | Japan . |
| 1273071 | 5/1972 | United Kingdom . |

OTHER PUBLICATIONS

Dictionary of Organic Compounds, 1965, vol. 5, pp. 2967 and 2968.

*Primary Examiner*—Howard E. Schain
*Assistant Examiner*—R. A. White
*Attorney, Agent, or Firm*—Gene Harsh; Lawrence S. Pope

[57] ABSTRACT

Thermoplastic aromatic polycarbonate molding compositions with improved flame retardancy which contain an alkali metal salt of an organic or inorganic acid and optionally a perfluoroethylene, characterized in that they contain a tetrahalogenophthalimide of the general formulae (I) or (II) or mixtures thereof

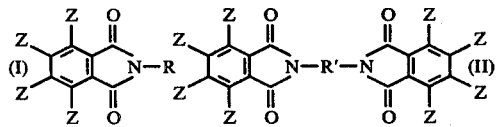

wherein
R denotes a hydrogen atom or a $C_1$ to $C_4$ alkyl $C_6H_5$, $C_{10}H_7$, $C_6H_4X$, $C_6H_3X_2$ or $C_6H_2X_3$ group, in which X denotes a fluorine, chlorine or bromine atom, R' denotes a single bond or a $C_2$ to $C_4$ alkylene, $C_6H_4$ or p-diphenylene radical, and Z denotes a chlorine or bromine atom, are provided.

13 Claims, No Drawings

POLYCARBONATE MOLDING COMPOSITIONS WITH IMPROVED FLAME-REPELLENCY

SUMMARY OF THE INVENTION

The present invention relates to polycarbonate molding compositions, based on high molecular weight, thermoplastic polycarbonates, with improved low flammability.

Although the known high molecular weight, thermoplastic polycarbonates are to be counted among the self-extinguishing plastics, for particular purposes it is desired to increase the low flammability of these plastics still further.

The present invention thus relates to polycarbonate molding compositions, based on high molecular weight thermoplastic polycarbonates, which contain (a) an alkali metal salt of an organic or inorganic acid, in particular a sodium, potassium or lithium salt, (b) a tetrahalogenophthalimide of the general formula (I) or (II)

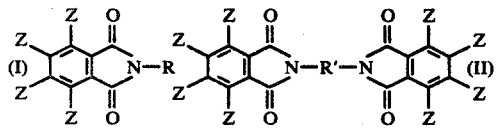

and optionally (c) a polytetrafluoroethylene.

In the formula I and II, R is H, $C_1$-$C_4$-alkyl, $C_6H_5$, $C_{10}H_7$, $C_6H_4X$, $C_6H_3X_2$ or $C_6H_2X_3$, wherein X denotes a fluorine, chlorine or bromine atom, and R' is a single bond, $C_2$-$C_4$-alkylene, $C_6H_4$ or p-diphenylene radical and Z denotes chlorine of bromine.

According to Underwriters' Laboratories Inc., Bulletin 94, Verbrennungstests zur Klassifizierung von Materialien (Combustion Tests for the Classification of Materials) (hereinafter called UL 94), in the case of test pieces with the dimensions 127×12.7×3.2 mm (⅛"), the polycarbonate molding compositions according to the present invention achieve a level in the burning class V-O; that is to say, they do not produce drips and have an average afterburning time of ≦5 seconds.

In the case of test pieces with the dimensions 127×12.7×1.6 mm (1/16"), the polycarbonate molding compositions according to the invention, without the addition of polytetrafluoroethylene, achieve a level in the burning class V-II; that is to say, they produce drips and achieve an average after-burning time of 30 seconds.

In the case of test pieces with the dimensions 127×12.7×1.6 mm (1/16"), the polycarbonate molding compositions containing polytetrafluoroethylene, according to the invention, also achieve a level in the burning class V-O according to UL 94.

The polycarbonate molding compositions according to the invention preferably contain the additives (a), (b) and (c) in the following amounts, in each case relative to the total weight of the polycarbonate: The additive (a) in amounts from 0.02 to 2% by weight, in particular in amounts from 0.05 to 1% by weight; the additive (b) in amounts from 0.02 to 2% by weight, in particular in amounts from 0.05 to 1% by weight; and optionally the additive (c) in amounts from 0.05 to 0.6% by weight, in particular in amounts from 0.1 to 0.3% by weight.

BACKGROUND OF THE INVENTION

It is known to improve the flameproof character of polycarbonates by adding alkali metal salts. (See, for example, U.S. Pat. Nos. 3,775,367 (Le A 12 278+Le A 14 723) and 3,836,490 (Le A 13263+Le A 13619) and British Pat. No. 1370744 (Le A 13 999) incorporated herein by reference.)

It is also known to improve the flameproof character of polycarbonates by adding organic chlorine compounds (see, for example, U.S. Pat. No. 3,357,942, DT-OS (German Published Specification) 2,122,300, French Patent Specification No. 1,439,030 and DT-OS (German Published Specification) No. 2,153,101 and DT-OS (German Published Specification) No. 2,243,226).

It is also known to improve the flameproof character of polycarbonates by adding organic bromine compounds.

It is also known to improve the flameproof character of polycarbonates by means of mixtures of organic chlorine compounds and certain inorganic salts (see, for example, DT-OS (German Published Specification) No. 2,013,496; suitable organic chlorine compounds which are mentioned are, inter alia, tetrachlorophthalic anhydride).

The synergistic effect of fluorinated polyolefins in flame-repellent polycarbonate molding compositions is also known (see, for example, DT-OS (German Published Specification) No. 2,535,262 and U.S. Pat. No. 3,651,174).

However, the polycarbonate molding compositions of low flammability, according to the instant invention, were not obvious since no additive combinations have been known hitherto which, after admixing such small amounts by weight as are necessary for the additive combinations according to the invention, already give polycarbonate molding compositions of the burning class V-O according to UL 94 at wall thicknesses of ⅛" and 1/16". The admixing, claimed according to the invention of tetrahalogenophthalimides of the general formula (I) or (II) is thus particularly advantageous because compounds of this class of substances are very stable to heat, of low volatility, and resistant to saponification and can be readily mixed into the polycarbonate.

DETAILED DESCRIPTION OF THE INVENTION

Alkali metal salts or organic acids which can be used are the sodium, potassium or lithium salts, in particular, however, the potassium salts, of organic sulphonic acids, phosphonic acids or carboxylic acids, the organic radicals of which can be optionally substituted by halogens, such as fluorine, chlorine or bromine are preferred. Especially preferred are alkali metal salts of $C_6$-$C_{15}$ aryl-sulphonic acids and $C_7$-$C_{15}$-aryl-carboxylic acids.

There may be mentioned in particular: sodium or potassium perfluorobutane sulphate, sodium or potassium perfluoromethanesulphonate, sodium or potassium 2,5-dichlorobenzene sulphate, sodium or potassium 2,4,5-trichlorobenzene sulphate, sodium or potassium (4-chlorophenyl)-phosphonate, sodium or potassium methylphosphonate, sodium or potassium (2-phenylethylene)-phosphonate, sodium or potassium pentachlorobenzoate, sodium or potassium 2,4,6-trichlorobenzoate, sodium or potassium 2,4-dichlorobenzoate and lithium phenylphosphonate. Alkali metal salts of inorganic acids are preferably those having a solubility in water at 20° C. of less than 2 g per liter water. Especially preferred are alkali metal salts of complex fluoroaluminates.

Examples which may be mentioned of alkali metal salts of inorganic acids are: trisodium or tripotassium hexafluoroaluminate, disodium or dipotassium hexafluorotitanate, disodium or dipotassium hexafluorosilicate, disodium or dipotassium hexafluorozirconate, sodium or potassium pyrophosphate, sodium or potassium metaphosphate, sodium or potassium tetrafluoroborate, sodium or potassium hexafluorophosphate and sodium, potassium or lithium phosphate.

Particularly suitablee salts are: sodium or potassium perfluorobutanesulphonate, sodium or potassium 2,5-dichlorobenzenesulphonate, sodium or potassium 2,4,5-trichlorobenzenesulphonate, potassium hexafluoroaluminate, potassium pyrophosphate, potassium methylphosphonate, sodium hexafluoroaluminate and lithium phenylphosphonate.

Mixtures of these salts with one another are also suitable.

Polytetrafluoroethylenes to be used for the additive combinations according to the invention are, for example, the products "Hostaflon 2024", "Hostaflon 2026" and "Hostaflon 2053" from Messrs. Hoechst. The "Hostaflons" are polytetrafluoroethylene powders having number-average molecular weights $\overline{M}_n$ between 400.000 and 900.000, and have a bulk density (measured according DIN 53468) of between 400 and 500 g per liter. "Hostaflon 2024" has an average particle size (measured according ASTM/D/1457/69T) of 500 μm, "Hostaflon 2026" has an average particle size of 550 μm and "Hostaflon 2053" has an average particle size of 600 μm.

The polytetrafluoroethylenes to be employed according to the invention are white solids which are prepared by known processes, such as, for example, by polymerizing tetrafluoroethylene in an aqueous medium with a catalyst which forms free radicals, for example, sodium peroxydisulphate, potassium peroxydisulphate or ammonium peroxydisulphate, under pressures from 7-71 kg/cm² and at temperatures from 0° to 200° C., preferably at temperatures from 20° to 100° C. (For further details see, for example, U.S. Pat. No. 2,393,967).

The polytetrafluoroethylenes suitable according to the invention should preferably have weight-average molecular weights $\overline{M}_w$ between about $10^5$ and about $10^6$.

Examples which may be mentioned of suitable tetrahalogenophthalimides, in the sense of the invention, according to formula (I) are: tetrachlorophthalimide, N-methyl-tetrachlorophthalimide, N-ethyltetrachlorophthalimide, N-propyl-tetrachlorophthalimide, N-isopropyl-tetrachlorophthalimide, N-butyl-tetrachlorophthalimide, N-isobutyl-tetrachlorophthalimide, N-phenyltetrachlorophthalimide, N-(4-chlorophenyl)-tetrachlorophthalimide, N-(3,5-dichlorophenyl)-tetrachlorophthalimide, N-(2,4,6-trichlorophenyl)-tetrachlorophthalimide, N-naphthyltetrachlorophthalimide, tetrabromophthalalimide, N-methyl-tetrabromophthalimide, N-ethyltetrabromophthalimide, N-propyl-tetrabromophthalimide, N-idospropyltetrabromophthalimide, N-butyl-tetrabromophthalimide, N-isobutyltetrabromo-phthalimide, N-phenyl-tetrabromophthalimide, N-(4-chlorophenyl)-tetrabromophthalimide, N-(3,5-dichlorophenyl)-tetrabromophthalimide, N-(2,4,6-trichlorophenyl)-tetrabromophthalimide and N-naphthyltetrabromophthalimide.

Examples which may be mentioned of suitable tetrahalogenophthalimides, in the sense of the invention, according to formula (II) are: N,N'-ethylene-di-tetrachlorophthalimide, N,N'-propylene-di-tetrachlorophthalimide, N,N'-butylene-di tetrachlorophthalimide, N,N'-p-phenylene-di-tetrachlorophthalimide, 4,4'-di-tetrachlorophthalimido-diphenyl, N-(tetrachlorophthalimido)-tetrachlorophthalimide, N,N'-ethylene-di tetrabromophthalimide, N,N'-propylene-di-tetrabromophthalimide. N,N'-butylene-di-tetrabromophthalimide, N,N'-p-phenylene-ditetrabromophthalimide, N,N'-di-tetrabromophthalimido-diphenyl and N-(tetrabromophthalimido)-tetrabromophthalimide.

Particularly suitable in the sense of the invention are: tetrachlorophthalimide, N-methyl- and H-phenyl-tetrachlorophthalimide, N,N'-ethylene-di-tetrachlorophthalimide and N-(tetrachlorophthalimido)-tetrachlorophthalimide.

Mixtures of different tetrahlogenophthalimides of the formulae (I) and (II) can also be used.

Homopolycarbonates and copolycarbonates which are based, for example, on one or more of the following diphenols: hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl) ketones, bis-(hydroxyphenyl) sulphoxides, bis-(hydroxyphenyl) sulphones and α,α'-bis-(hydroxyphenyl)diisopropylbenzenes and their nuclear-alkylated compounds are to be understood as thermoplastic aromatic polycarbonates to be provided, according to the invention, with a flameproof finish.

These and further suitable diphenols are described, for example, in U.S. Pat. Nos. 3,028,365, 2,999,835, 3,148,172, 3,271,368, 2,991,273, 3,271,367, 3,280,078, 3,014,891 and 2,999,846, in German Offenlegungsschriften (German Published Specifications) Nos. 1,570,703, 2,063,050, 2,063,052, 2,211,956 and 2,211,957, in French Patent Specification No. 1,561,518 and in the monograph "H. Schnell, Chemistry and Physics of Polycarbonates, Interscience Publishers, New York, 1964".

Preferred diphenols are, for example: 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)cyclohexane, α,α'-bis-(4-hydroxyphenyl)p-diisopropylbenzene, 2,2-bis-(3-methyl-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl) sulphone, 2,4-bis-(3,5-dimethyl-4-hydroxyphenyl)-2-methylbutane, 1,1-bis-(3,5-dimethyl-4-hydroxyphenyl)-cyclohexane and α,α'-bis-(3,5-dimethyl-4-hydroxyphenyl)-p-diisopropylbenzene.

Particularly preferred diphenols are, for example: 2,2-bis-(4-hydroxyphenyl)-propane, 2,2-bis-(3,5-dimethyl-4-hydroxyphenyl)-propane and 1,1-bis-(4-hydroxyphenyl)-cyclohexane.

Preferred aromatic polycarbonates are those which are based on one or more of the diphenols mentioned as preferred. Particularly preferred copolycarbonates are those based on 2,2-bis-(4-hydroxyphenyl)-propane and one of the other diphenols mentioned as particularly preferred. Furthermore, polycarbonates based on 2,2-bis-(4-hydroxyphenyl)-propane or 2,2-bis-(3,5-dimethyl-4-hydroxyphenol)-propane alone are particularly preferred.

The aromatic polycarbonates can be prepared by known processes, such as, for example, from bisphenol and diphenylcarbonate by the melt transesterification process and from bisphenols and phosgene by the two-phase boundary process, as is described in the above-mentioned literature.

The aromatic polycarbonates can be branched by incorporating small amounts, preferably amounts between 0.05 and 2.0 mol % (relative to diphenols employed), of trifunctional or more than trifunctional compounds, in particular those with three or more than three phenolic hydroxyl groups.

Polycarbonates of this type are described, for example, in German Offenlegungsschriften (German Published Specifications) Nos. 1,570,533, 1,595,762, 2,116,974 and 2,113,347, British patent specification No. 1,079,821, U.S. Pat. No. 3,544,514 and in German Patent Application No. P 2,500,092.4 (LeA 16,142).

Some of the compounds which can be used, with three or more than three phenolic hydroxyl groups, are, for example, phloroglucinol, 4,6-dimethyl-2,4,6-tri-(4-hydroxyphenyl)-heptene-2,4,6-dimethyl-2,4,6-tri-(4-hydroxyphenyl)-heptane, 1,3,5-tri-(4-hydroxyphenyl)-benzene, 1,1,1-tri-(4-hydroxyphenyl)ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol-2,6-bis-(2'-hydroxy-5'-methyl-benzyl)-4-methylphenol, 2-(4-hydroxyphenyl)-2-(2,4-dihydroxyphenyl)-propane and 1,4-bis-(4,4''-dihydroxytriphenyl-methyl)-benzene. Some of the other trifunctional compounds are 2,4-dihydroxybenzoic acid, trimesic acid, cyanuric chloride, 3,3-bis-(4-hydroxyphenyl)-2-oxo-2,3-di-hydroindole and 3,3-bis-(3-methyl-4-hydroxyphenyl)-2-oxo-2,3-di-hydroindole.

As a rule, the thermoplastic aromatic polycarbonates should have mean weight-average molecular weights $\overline{M}_w$ from 10,000 to over 200,000, preferably from 20,000 to 80,000, determined by measurements of the relative viscosity in $CH_2Cl_2$ at 25° C. and a concentration of 0.5% by weight.

In the case of polycarbonate mixtures, small proportions of low molecular weight polycarbonates, for example with an average degree of polymerization of 2–20, can also be admixed to the high molecular weight polycarbonates with $\overline{M}_w$ from 10,000 to 200,000.

Moreover, other materials, such as antistatic agents, pigments, mold release agents, heat stabilizers, ultraviolet light stabilizers and reinforcing fillers can be admixed to the polycarbonate molding compositions, according to the invention, of low flammability.

The polycarbonate molding compositions according to the invention are obtained by mixing the aromatic polycarbonates with the additive combinations according to the invention in the melt, for example, in an extruder.

The aromatic polycarbonate on which the polycarbonate molding compositions, according to the invention, in the examples which follow are based is a homopolymer of 2,2-bis-(4-hydroxyphenyl)-propane (hereinafter called bisphenol A), which has been prepared by reacting substantially equimolar amounts of bisphenol A and phosgene with sodium hydroxide, triethylamine and p-tert.-butyl-phenol by the two-phase boundary process under standard conditions.

The relative solution viscosity of the polycarbonate was 1.280, measured at 25° C. in a 0.5% strength by weight solution in methylene chloride. The resulting polymers was then extruded at 270° and comminuted to granules. These granules were used for the preparation of the polycarbonate molding compositions according to the invention by admixing the additive combinations listed in the examples in the table which follows. The granules obtained by this extrusion procedure were shaped, in the injection molding process at 300°–310° C., to give test rods with the dimensions: 127×12.7×1.6 mm (1/16") and 127×12.7×3.2 mm (⅛"). The test rods (10 samples for each additive combination listed in the table) were subjected to the test procedure of Underwriters' Laboratories, Inc., Bulletin 94, Verbrennungstests zur Klassifizierung von Materialien (Combustion Tests for the Classification of Materials, UL 94). According to this procedure, the materials were classified as either UL-94 V-O, UL-94 V-I or UL-94 V-II, on the basis of the test results obtained for the 10 samples. The criteria for each of these V classifications according to UL-94 are, briefly, as follows: UL-94 V-O: The average flaming and/or smoldering after removing the igniting flame should not exceed 5 seconds and none of the samples should produce drips of particles which ignite absorbent cotton. UL-94 V-I: The average flaming and/or smoldering after removing the igniting flame should not exceed 25 seconds and none of the samples should produce drips of particles which ignite absorbent cotton.

UL-94 V-II: The average flaming and/or smoldering after removing the igniting flame should not exceed 25 seconds and the samples produce drips of burning particles which ignite absorbent cotton.

Furthermore, according to the standard conditions of the present invention, a test rod which burned for more than 25 seconds after removing the igniting flame was not classified according to UL-94 but was designated as "burns". Additionally, the UL-94 procedure required that all test rods of a test fulfill the particular V grading, otherwise the 10 test rods must receive the grading of the worst individual rod. For example, if one rod is graded as UL-94 V-II and the other 9 test rods are graded as UL-94 V-O, all 10 rods receive the grading UL-94 V-II.

The results are summarized in the table which follows:

| | Base material: Homopolycarbonate of bisphenol A with a relative solution viscosity of $\eta_{rel} = 1.280$ (contains no incorporated 3-functional or polyfunctional phenol) | | | | |
|---|---|---|---|---|---|
| Example | Salt additive (% by weight) | Polytetrafluoroethylene (% by weight) | Tetrachlorophthalimide (% by weight) | Grading (⅛") UL-94 | Grading (1/16") UL-94 |
| 1 | Potassium hexafluorotitanate (0.1%) | — | — | V-2 | V-2 |
| 2 | Potassium hexafluorosilicate (0.1%) | — | — | V-2 | V-2 |
| 3 | Potassium pyrophosphate 0.25%) | — | — | V-2 | V-2 |

-continued

Base material: Homopolycarbonate of bisphenol A with a relative solution viscosity of
$\eta_{rel} = 1.280$ (contains no incorporated 3-functional or polyfunctional phenol)

| Example | Salt additive (% by weight) | Polytetrafluoroethylene (% by weight) | Tetrachlorophthalimide (% by weight) | Grading (⅛") UL-94 | Grading (1/16") UL-94 |
|---|---|---|---|---|---|
| 4 | Trisodium hexafluoroaluminate (0.25%) | — | — | V-2 | V-2 |
| 5 | Sodium (2-phenylethylene)-phosphonate (0.1%) | — | — | V-2 | V-2 |
| 6 | Sodium 2,5-dichlorobenzenesulphonate (0.1%) | — | — | V-1 | V-2 |
| 7 | Potassium pyrophosphate (0.25%) | Hostaflon TF 2026 (0.1%) | — | V-2 | V-2 |
| 8 | Tripotassium hexafluoroaluminate (0.25%) | Hostaflon TF 2026 (0.1%) | — | V-2 | V-2 |
| 9 | Potassium pyrophosphate (0.25%) | — | N-methyltetrachlorophthalimide (0.5%) | V-0 | V-2 |
| 10 | Tripotassium hexafluoroaluminate (0.25%) | — | N-methyltetrachlorophthalimide (0.5%) | V-0 | V-2 |
| 11 | Trisodium hexafluoroaluminate (0.25%) | — | N-methyltetrachlorophthalimide (0.5%) | V-0 | V-2 |
| 12 | Potassium hexafluorotitanate (0.25%) | — | N-methyltetrachloropthalimide (0.5%) | V-0 | V-2 |
| 13 | Potassium tetrafluoroborate (0.25%) | — | N-methyltetrachlorophthalimide (0.5%) | V-0 | V-2 |
| 14 | Tripotassium hexafluorosilicate (0.25%) | — | N-methyltetrachlorophthalimide (0.5%) | V-0 | V-2 |
| 15 | Potassium pyrophosphate (0.1%) | Hostaflon TF 2026 (0.1%) | N-methyltetrachlorophthalimide (0.25%) | V-0 | V-0 |
| 16 | Potassium phosphate (0.25%) | Hostaflon TF 2026 (0.1%) | N-phenyltetrachlorophthalimide (0.5%) | V-0 | V-0 |
| 17 | Potassium phosphate (0.25%) | Hostaflon TF 2026 (0.1%) | N,N'-ethylene-di-tetrachlorophthalimide (0.5%) | V-0 | V-0 |
| 18 | Potassium phosphate (0.25%) | Hostaflon TF 2026 (0.1%) | octachloro-N-phthalimido-phthalimide (0.5%) | V-0 | V-0 |
| 19 | Trisodium hexafluoroaluminate (0.25%) | Hostaflon TF 2026 (0.1%) | N-methyl-tetrachlorophthalimide (0.5%) | V-0 | V-0 |
| 20 | Potassium hexafluorotitanate (0.25%) | Hostaflon TF 2053 (0.1%) | N-methyl-tetrachlorophthalimide (0.5%) | V-0 | V-0 |
| 21 | Potassium hexafluorosilicate (0.25%) | Hostaflon TF 2053 (0.1%) | N-methyl-tetrachlorophthalimide (0.5%) | V-0 | V-0 |
| 22 | Tripotassium hexafluoroaluminate (0.15%) | Hostaflon TF 2026 (0.1%) | N-methyltetrachlorophthalimide (0.25%) | V-0 | V-0 |
| 23 | Potassium metaphosphate (0.2%) + potassium pyrophosphate (0.05%) | Hostaflon TF 2053 (0.1%) | N-methyltetrachlorophthalimide (0.5%) | V-0 | V-0 |
| 24 | Potassium metaphosphate (0.2%) + tripotassium hexafluoroaluminate (0.05%) | Hostaflon TF 2053 (0.1%) | N-methyltetrachlorophthalimide (0.5%) | V-0 | V-0 |
| 25 | Potassium metaphosphate (0.2%) + trisodium hexafluoroaluminate (0.05%) | Hostaflon 2053 (0.1%) | N-methyltetrachlorophthalimide (0.5%) | V-0 | V-0 |
| 26 | Sodium 2,5-dichlorobenzenesulphonate (0.25%) | Hostaflon TF 2026 (0.1%) | N-methyltetrachlorophthalimide (0.5%) | V-0 | V-0 |
| 27 | Disodium methylphosphonate (0.25%) | Hostaflon TF 2026 (0.1%) | N-methyltetrachlorophthalimide (0.5%) | V-0 | V-0 |
| 28 | Sodium 2,4-dichlorobenzoate (0.25%) | Hostaflon TF 2026 (0.1%) | N-methyltetrachlorophthalimide (0.5%) | V-0 | V-0 |
| 29 | Sodium 2,5-dichlorobenzene sulphonate (0.25%) | — | N-methyltetrachlorophthalimide (0.5%) | V-0 | V-2 |
| 30 | Disodium methylphosphonate (0.25%) | — | N-methyltetrachlorophthalimide (0.5%) | V-0 | V-2 |
| 31 | Sodium 2,4-dichlorobenzoate (0.25%) | — | N-methyltetrachlorophthalimide (0.5%) | V-0 | V-2 |
| 32 | Trisodium hexafluoroaluminate (0.05%) | — | N-methyltetrachlorophthalimide (0.25%) | V-0 | V-2 |
| 33 | Trisodium hexafluoroaluminate | — | N-methyltetrachloro- | V-0 | V-2 |

-continued

Base material: Homopolycarbonate of bisphenol A with a relative solution viscosity of
$\eta_{rel} = 1.280$ (contains no incorporated 3-functional or polyfunctional phenol)

| Example | Salt additive (% by weight) | Poly-tetrafluoro-ethylene (% by weight) | Tetrachloro-phthalimide (% by weight) | Grading (⅛") UL-94 | Grading (1/16") UL-94 |
|---|---|---|---|---|---|
| | (0.03%) | | phthalimide (0.1%) | | |
| 34 | Trisodium hexafluoro-aluminate (0.05%) | Hostaflon TF 2053 (0.1%) | N-methyltetra-chlorophthalimide (0.25%) | V-0 | V-0 |
| 35 | Trisodium hexafluoro-aluminate (0.02%) | Hostaflon TF 2053 (0.05%) | N-methyltetra-chlorophthal-imide (0.1%) | V-0 | V-0 |
| 36 | Trisodium hexafluoro-aluminate (0.05%) | Hostaflon TF 2053 (0.1%) | Tetrabromophthal-imide (0.25%) | V-0 | V-0 |
| 37 | Trisodium hexafluoro-aluminate (0.05%) | Hostaflon TF 2053 (0.1%) | N-methyl-tetra bromophthalimide (0.25%) | V-0 | V-0 |
| 38 | Trisodium hexafluoro-aluminate (0.05%) | Hostaflon TF 2053 (0.1%) | Tetrachloro-phthalimide (0.25%) | V-0 | V-0 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polycarbonate molding composition, comprising a high molecular weight thermoplastic polycarbonate, 0.02 to 2% by weight, based on the weight of the polycarbonate, of an alkali metal salt of an organic acid selected from the group consisting of sulphonic, phosphonic and carboxylic acids or an alkali metal salt of an inorganic acid having a solubility in water at 20° C. of less than 2 g per liter of water and 0.02 to 2% by weight, based on the weight of the polycarbonate, of a tetrahalogenophthalimide of the general formula (I) or (II) or mixtures thereof

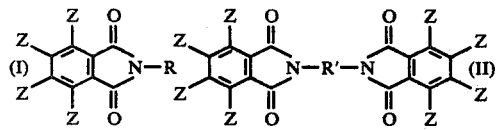

wherein

R denotes H or $C_1$ to $C_4$ alkyl, $C_6H_5$, $C_{10}H_7$, $C_6H_4X$, $C_6H_3X_2$ or $C_6H_2X_3$, in which X denotes a fluorine, chlorine or bromine atom, and R' denotes a single bond or a $C_2$ to $C_4$ alkylene, $C_6H_4$ or p-diphenylene radical and Z denotes a chlorine or bromine atom.

2. The polycarbonate molding composition according to claim 1, wherein a polytetrafluoroethylene is present in an amount of 0.05 to 0.6% by weight relative to the total weight of the polycarbonate.

3. The polycarbonate molding composition according to claim 2, wherein the polytetrafluoroethylene is present in an amount of 0.1 to 0.3% by weight relative to the total weight of the polycarbonate.

4. The polycarbonate molding composition according to claim 1, wherein the tetrahalogenophthalimide is present in an amount of 0.05 to 1% by weight, relative to the total weight of polycarbonate.

5. The polycarbonate molding composition according to claim 1, wherein the tetrahalogenophthalimide is N-phenyl-tetrachlorophthalimide, N,N'-ethylene-di-tetra-chlorophthalimide or N-(tetrachlorophthalimido)-tetrachlorophthalimide, or a mixture thereof.

6. The polycarbonate molding composition according to claim 1, wherein the tetrahalogenophthalimide is N-methyltetrachlorophthalimide, tetrachlorophthalimide or tetrabromophthalimide.

7. The polycarbonate molding composition according to claim 1, wherein the alkali metal salt of the organic or inorganic acid is present in an amount of 0.05 to 1% by weight, relative to the total weight of polycarbonate.

8. The polycarbonate molding composition according to claim 7, wherein the alkali metal salt of the organic or inorganic acid is selected from the group consisting of sodium or potassium 2,5-dichlorobenzenesulphonate, sodium or potassium 2,4,5-trichlorobenzenesulphonate, potassium hexafluoroaluminate, potassium pyrophosphate, potassium methylphosphate, sodium hexafluoroaluminate, lithium phenylphosphonate, and mixtures of these salts.

9. A polycarbonate molding composition, which comprises:
   (a) a high molecular weight thermoplastic aromatic polycarbonate;
   (b) 0.02 to 2% by weight, based on the weight of the polycarbonate, of an alkali metal salt of an organic acid selected from the group consisting of sulphonic, phosphonic and carboxylic acids or an alkali metal salt of an inorganic acid having a solubility in water at 20° C. of less than 2 g per liter of water;
   (c) 0.02 to 2% by weight, based on the weight of the polycarbonate, of a tetrahalogenophthalimide of the general formula (I) or (II) or mixtures thereof

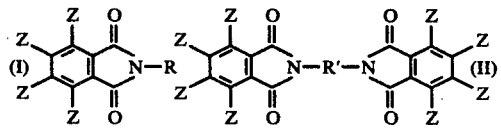

wherein

R denotes H, a $C_1$ to $C_4$ alkyl, $C_6H_5$, $C_{10}H_7$, $C_6H_4X$, $C_6H_3X_2$ or $C_6H_2X_3$ group, in which X denotes a fluorine, chlorine or bromine atom, and R' denotes a single bond or a $C_2$ to $C_4$ alkylene, $C_6H_4$ or p-diphenylene radical and Z denotes a chlorine or bromine atom; and (d) 0.05 to 0.6% by weight, based on the weight of the polycarbonate, of a polytetrafluoroethylene.

10. The polycarbonate molding composition according to claim 9, wherein the polytetrafluoroethylene has a weight-average molecular weight $\overline{M}_w$ between about $10^5$ and about $10^6$.

11. The polycarbonate molding composition according to claim 9, wherein the thermoplastic aromatic polycarbonate has a weight-average molecular weight $\overline{M}_w$ between about 20,000 and about 80,000 determined by measurements of the relative viscosity in $CH_2Cl_2$ at 25° C. and a concentration of 0.5% by weight.

12. The polycarbonate molding composition according to claim 9, further comprising members selected from the group consisting of a pigment, a mold release agent, a heat stabilizer, an ultraviolet light stabilizer, and a filler.

13. In a polycarbonate molding composition containing a high molecular weight, thermoplastic, aromatic polycarbonate and 0.02 to 2% by weight, based on the weight of the polycarbonate, of an alkali metal salt of an organic acid selected from the group consisting of sulphonic, phosphonic and carboxylic acids or an alkali metal salt of an inorganic acid having a solubility in water at 20° C. of less than 2 g per liter of water, the improvement comprising:

(a) 0.02 to 2% by weight, based on the weight of the polycarbonate, of a tetrahalogenophthalimide of the general formula (I) or (II)

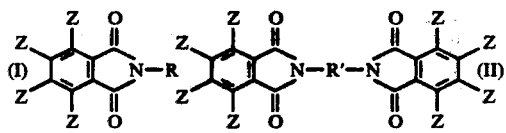

wherein
R denotes H, a $C_1$ to $C_4$ alkyl, $C_6H_5$, $C_{10}H_7$, $C_6H_4X$, $C_6H_3X_2$ or $C_6H_2X_3$ group, in which X denotes a fluorine, chlorine or bromine atom, R' denotes a single bond or a $C_2$ to $C_4$ alkylene, $C_6H_4$ or p-diphenylene radical and Z denotes a chlorine or bromine atom or mixtures thereof.

* * * * *